United States Statutory Invention Registration [19]

[11] Reg. Number: H908

Dawson [43] Published: Apr. 2, 1991

[54] METHOD AND SYSTEM FOR IMPROVED RESOLUTION OF A COMPENSATED CALORIMETER DETECTOR

[75] Inventor: John W. Dawson, Willowbrook, Ill.

[73] Assignee: The United States of America as represented by the United States Department of Energy, Washington, D.C.

[21] Appl. No.: 355,522

[22] Filed: May 23, 1989

[51] Int. Cl.[5] ..... G01J 1/00

[52] U.S. Cl. ..... 250/336.1

*Primary Examiner*—Thomas H. Tarcza
*Assistant Examiner*—Linda J. Wallace
*Attorney, Agent, or Firm*—Frank J. Kozak; Paul A. Gottlieb; William R. Moser

[57] ABSTRACT

An improved method and system for a depleted uranium calorimeter detector used in high energy physics experiments. In a depleted uranium calorimeter detector, the energy of a particle entering the calorimeter detector is determined and the output response of the calorimeter detector is compensated so that the ratio of the integrated response of the calorimeter detector from a lepton to the integrated response of the calorimeter detector from a hadron of the same energy as the lepton is approximately equal to 1. In the present invention, the energy of a particle entering the calorimeter detector is determined as a function of time and the hadron content of the response of the calorimeter detector is inferred based upon the time structure of the energy pulse measured by the calorimeter detector. The energy measurement can be corrected based on the inference of the hadron content whereby the resolution of the calorimeter can be improved.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND SYSTEM FOR IMPROVED RESOLUTION OF A COMPENSATED CALORIMETER DETECTOR

CONTRACTUAL ORIGIN OF THE INVENTION

The U.S. Government has rights in this invention pursuant to Contract No. W-31-109-ENG-3 between the United States Department of Energy and the University of Chicago, operator of Argonne National Laboratory.

BACKGROUND OF THE INVENTION

This invention relates to a calorimeter detector that can be used in conjunction with high energy physics particle collider experiments. In particular, this invention is a method for and a system of achieving improved resolution from a depleted uranium calorimeter detector by inferring the hadron content of the calorimeter excitation.

One of the fundamental experiments in high energy physics is to cause particles to collide into targets (or other particles) and observe the results of these collisions. Physicists have tried over the years to increase the energy of these collisions in order to produce heretofore undetected subatomic particles (or learn more about known particles) in order to advance the theoretical understanding of matter and energy. The collider at Fermilab is an example of a device used to conduct this type of experiment. New colliders have been proposed, such as the Superconducting Super Collider in Texas and HERA in West Germany, that would impart even more energy to the colliding particles.

A high energy physics collider includes an accelerator portion and a detector portion. The accelerator portion gets the particles moving in specific paths at very high energies and causes the particles to collide with other particles. The detector portion of the collider provides the experimenters with information about the results of the collisions, in particular the trajectories and energies of the resultant particles. Both the accelerator portion and the detector portion define the limits of the collider's utility. Accordingly, the accelerator and the detector are designed to complement each other. Advances in accelerator design to impart more energy to the colliding particles must coincide with improvements in detector design to record the products produced by the collisions. It follows that accelerating particles to a new, higher level of energy would have little utility if the detector equipment associated with the collider could not measure or observe the results of collisions that occurred at that energy. Moreover, since the costs of detector design are part of the overall budget for construction of a collider, an improvement in resolution of the detector can result in significant savings for the project or make available funding for other aspects of the collider that would otherwise have to be spent on the detector.

Different types of detectors are used at modern high energy physics colliding beam facilities. The detectors are constructed so that they surround the interaction region, i.e. the area where the collisions take place. The detectors consist of layers of electronic equipment which are sensitive to different properties of the particles which traverse them. The innermost layers or regions are usually devoted to a type of detector which is a tracking device that provides information about the position of the particles as they leave the interaction region. The next layer or region usually includes a type of detector which is a calorimeter that measures the energy of the particles leaving the interaction region. Usually in the outermost layer or region, there is included a type of detector devoted to detecting and identifying muons. Information from all these layers of detecting equipment is transferred to a host computer when an event of interest has occurred in the interaction region.

When high energy particles enter the calorimeter detector, they interact with the massive material of the calorimeter and the result is a shower. The particles which cause the shower are both hadrons and leptons in some proportion to one another. The function of the calorimeter detector is to measure the energy of the incident particles, and the resolution with which the measurement is made is of critical importance in a physics experiment. Typically, in a calorimeter in a high energy physics detector, one of the factors limiting the resolution is that the response of the calorimeter to a hadron and a lepton is different. A very considerable amount of effort is given to trying to make the e/h ratio equal to 1, i.e. to make the response of the calorimeter the same for leptons and hadrons of the same energy.

One method of making the calorimeter response independent of particle type is to use depleted uranium for the dense medium of the calorimeter detector. If depleted uranium is used in the calorimeter detector, a fission mechanism can, under the right circumstances, compensate the calorimeter response, such that the e/h ratio is adjusted closer to unity thereby making the calorimeter detector less energy dependent.

Accordingly, it is an object of the present invention to provide improved resolution from a calorimeter detector used for high energy physics experiments.

It is another object of this invention to provide improved resolution from a compensated calorimeter detector in a efficient manner and without the inclusion of complex and expensive equipment.

It is another object of this invention to provide a system and method for improved resolution in a depleted uranium calorimeter detector.

It is still another object of this invention to provide a system and method for an improved resolution in a depleted uranium calorimeter detector through differentiation of the response of the calorimeter detector to leptons and hadrons.

It is yet another object of the present invention to provide a means to infer the hadron content of the response of a calorimeter detector to provide improved resolution in an off-line analysis.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objectives and in accordance with the purposes of the present invention, as embodied and broadly described herein, the method and system of the present invention provide for an improvement of a compensated calorimeter detector. In a depleted uranium calorimeter detector, the response of the calorimeter to a particle entering the detector is compensated so that in a given energy range the ratio of the integrated response of the calorimeter detector resulting from a lepton to the integrated response of the calorimeter detector resulting from a hadron of the same energy as the lepton is approximately equal to 1. The present invention provides an improvement wherein the hadron content of the response of the calorimeter can be inferred based upon the time structure of the energy pulse measured by the calorimeter detector. Based upon this inference regarding the hadron content, the resolution of the calorimeter detector can be improved.

DETAILED DESCRIPTION OF THE INVENTION

Figure 1:
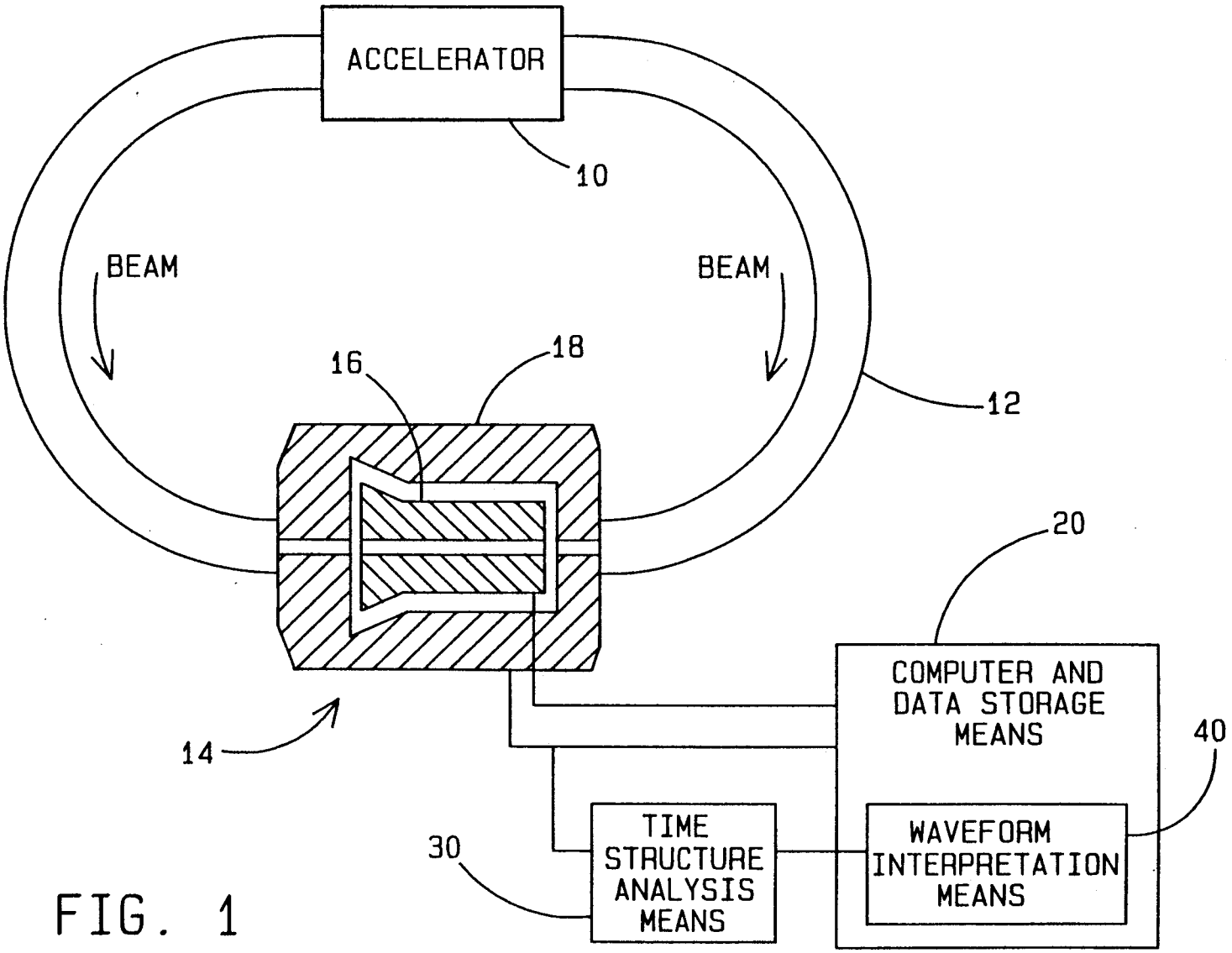
FIG. 1 depicts schematically a collider design including a calorimeter detector.

Referring to FIG. 1, there is depicted a simplified representation of a collider such as used in high energy physics experiments. Particles are accelerated by accelerator 10 in beam pipe 12. Accelerator 10 and other equipment direct the particles so that collisions of particles take place in area 14. The particles resulting from these collisions fly off in different directions from the point of collision. These resultant particles are detected by devices that are positioned in layers around the beam pipe. These detection devices are sensitive to different properties of the particles which traverse the device. Detectors 16 located close next to the beam pipe are usually tracking devices which provide information about the position of the particles as they leave the interaction region of the beam pipe. In the next innermost region there is normally located one or more calorimeters 18 which measure the energy of the particles leaving the interaction region. The detectors provide an output signal to computer and data storage means 20 where the data from the detectors are saved, interpreted, or otherwise used by the experimenter.

The types of particles the energy of which experimenters intend to measure with the calorimeter are hadrons and leptons. As discussed above, because the response of the calorimeter to a hadron is different than the response of the calorimeter to a lepton of the same energy as the hadron, there is imposed a limitation on the resolution of a calorimeter. It is for this purpose that an object of improved calorimeter design for a number of years has been to make the response of the calorimeter the same for leptons and hadrons having the same energy (i.e., compensate for the lower response of the calorimeter associated with the hadron). This objective can be approximately attained by the use of depleted uranium as the dense material in the calorimeter detector.

The depleted uranium calorimeter equalizes the response of the calorimeter by increasing the energy response associated with a hadron. Without compensation, the response of the calorimeter to a lepton is greater than the response of the calorimeter to a hadron (assuming the lepton and hadron have the same energy). With the use of depleted uranium as a dense medium in the calorimeter, a hadron initiates neutrons that cause a fission reaction to take place with the depleted uranium. This results in a contribution to the energy perceived for the hadron. A lepton does not initiate a fission reaction. For a lepton, the calorimeter measures only electromagnetic energy. In this manner, the response of the calorimeter to hadrons and leptons can be equalized. It can be appreciated that this compensation scheme is only approximate. Careful calibration of the depleted uranium medium is required in order to obtain a ratio of the energy response of the hadrons and leptons close to unity.

The present invention advances from the current design of the depleted uranium calorimeter. The present invention takes advantage of the compensating mechanism provided by the depleted uranium calorimeter and provides a means for inferring the hadron content of the response. This also permits the distinguishing of hadrons and leptons based upon their energy response. As mentioned above, the depleted uranium medium compensates for the lower energy perceived to be the energy of the hadrons by producing a fission reaction that results only from hadrons. Current design of depleted uranium calorimeters seeks only to make the total energy perceived for the hadron the same as that perceived for the lepton. The present invention takes advantage of the feature that a portion of the compensated energy response of the calorimeter to a hadron tends to take place later than the uncompensated energy response of the calorimeter to a lepton. This follows from consideration of the mechanism of the compensated response to a hadron, i.e. the hadron creates neutrons to interact with the depleted uranium and this fission process contributes to the total energy response. There is a small time delay for the fission reaction to occur and for the response from this fission process to be perceived by the calorimeter. By including means to recognize the time structure of the energy response, the hadron content of the calorimeter response can be inferred. This method can also be used to distinguish whether the response of the calorimeter results from a hadron or a lepton.

Figure 2:
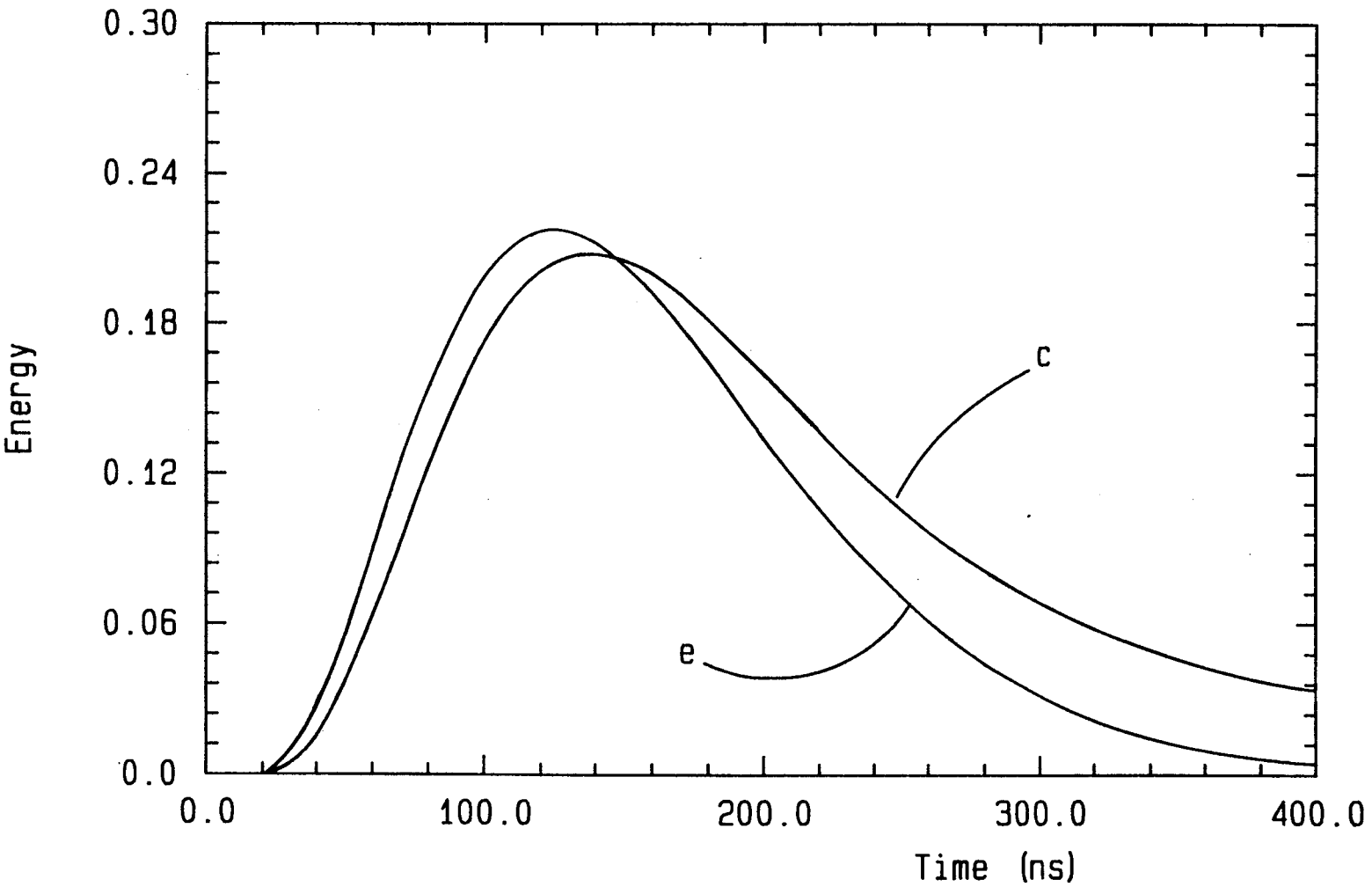
FIG. 2 is a graph depicting the energy pulses versus time for a compensated response and for a non-compensated response.

The time structure of a pulse of a lepton and a hadron is shown in FIG. 2. Referring to FIG. 2, the pulse from associated with electromagnetic energy such as a lepton, is represented by the curve marked "e". The curve marked "c" shows the response to a hadron in which a fission reaction takes place with the depleted uranium. Note that the total integrated energy response of the two curves is approximately equal, i.e. e/h equals 1. This has been the objective of calorimeter design for some time. However, the compensated response of the hadron has a flatter waveform that can be distinguished from the steeper waveform of the lepton response.

Another way to express this is that the time response of the fission mechanism is slightly slower than the ionization output of the calorimeter. Since the fission mechanism is a response only to hadrons, a careful recording of the time structure of the output wave shape of the calorimeter response can be used to give an indication of the hadron content of the calorimeter excitation. If there is a quantitative indication of this hadron content it can then be used in the off-line analysis to improve the energy resolution since it gives a measure of the hadron content of the shower. Previously the output of calorimeters had always just been integrated and the time structure had been lost. If that is done there would be no way to recover the information relating to the time structure of the pulse.

Adaptation of the present invention to a compensated calorimeter requires the addition of electronic devices that provide information about the precise time structure of the calorimeter output (for example, time structure analysis means 30 in FIG. 1). Electronic devices which might be used are flash encoders, gated charge coupled devices or switched capacitor devices. The means for distinguishing the precise time structure of the energy pulse measured by the detector could be incorporated in the output of the calorimeter. The computer means would include a means for interpreting the data so as to distinguish the compensated from the non-compensated pulses (waveform interpretation means 40 in FIG. 1). It is also important in the design of the equipment that measures the time profile of calorimeter output pulse that any filter time constants are short compared to the time structure of the fission mechanism.

The embodiments of the invention in which a statutory invention registration is claimed are defined as follows:

1. A method of improving the resolution of a calorimeter detector used in high energy physics experiments that includes:

a means for determining the energy of a particle entering the calorimeter detector, and a means for compensating the output response of the calorimeter detector so that the ratio of the response of the calorimeter detector from a lepton to the response of the calorimeter detector from a hadron having the same energy as the lepton is approximately equal to 1, the improved method comprising:

inferring the hadron content of the response of the calorimeter detector based upon the time structure of the output response, correcting the energy measurement of the calorimeter based on the determination of the hadron content of the calorimeter response.

2. An improvement for a calorimeter detector used in high energy physics experiments that includes:

a means for determining the energy of a particle entering the calorimeter detector, and a means for compensating the output response of the calorimeter detector so that the ratio of the response of the calorimeter detector from a lepton to the response of the calorimeter detector from a hadron having the same energy as the lepton is approximately equal to 1, the improvement comprising:

means for inferring the hadron content of the response of the calorimeter detector based upon the time structure of the energy pulse measured by the calorimeter detector, and means for correcting the energy measurement based on the determination of the hadron content of the response of the calorimeter detector whereby the resolution of the calorimeter can be improved.

3. A calorimeter detector for use in high energy physics experiments comprising:

a means for determining the energy of a particle entering the detector as a function of time, a means for compensating the output response of the calorimeter detector so that the ratio of the response of the calorimeter detector from a lepton to the response of the calorimeter detector from a hadron of the same energy as the lepton is approximately equal to 1, means for inferring the hadron content of the calorimeter detector based upon the time structure of the energy pulse measured by the detector, said means for inferring the hadron content being responsive to said means for determining the energy of a particle entering the detector, and means for correcting the energy measurement based on the inference of the hadron content of the response of the calorimeter detector based upon the time structure of the energy pulse measured by the calorimeter detector, whereby the resolution of the calorimeter detector can be improved.

* * * * *